US010352774B2

(12) United States Patent
Miller

(10) Patent No.: US 10,352,774 B2
(45) Date of Patent: Jul. 16, 2019

(54) METHODS AND APPARATUS TO MONITOR COMPONENTS OF AN AIRCRAFT LANDING SYSTEM

(71) Applicant: The Boeing Company, Chicago, IL (US)

(72) Inventor: Trent Daryl Miller, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/194,157

(22) Filed: Jun. 27, 2016

(65) Prior Publication Data

US 2016/0305826 A1 Oct. 20, 2016

Related U.S. Application Data

(63) Continuation of application No. 13/830,109, filed on Mar. 14, 2013.

(51) Int. Cl.

| | |
|---|---|
| ***G01K 3/04*** | (2006.01) |
| ***F16D 66/00*** | (2006.01) |
| ***B60T 8/17*** | (2006.01) |
| ***B64C 25/42*** | (2006.01) |
| ***B60T 17/22*** | (2006.01) |
| ***B60T 8/88*** | (2006.01) |

(52) U.S. Cl.

CPC .............. *G01K 3/04* (2013.01); *B60T 8/1703* (2013.01); *B60T 8/885* (2013.01); *B60T 17/221* (2013.01); *B64C 25/42* (2013.01); *F16D 66/00* (2013.01); *B60C 2200/02* (2013.01); *B60T 2270/406* (2013.01); *F16D 2066/001* (2013.01)

(58) Field of Classification Search

CPC ......... G01K 3/04; B60T 8/1703; B60T 8/885; F16D 66/00

USPC .......................................................... 374/104

See application file for complete search history.

(56) References Cited

U.S. PATENT DOCUMENTS

| | | | |
|---|---|---|---|
| 3,454,925 | A | 7/1969 | Ruof |
| 3,582,926 | A | 6/1971 | Hassan |
| 4,365,643 | A | 12/1982 | Masclet et al. |

(Continued)

FOREIGN PATENT DOCUMENTS

| | | |
|---|---|---|
| CN | 1867466 | 11/2006 |
| DE | 102010044899 | 3/2011 |

(Continued)

OTHER PUBLICATIONS

Canadian Intellectual Property Office, "Office Action," issued in connection with Application No. 2,843,568, dated Mar. 20, 2015, 4 pages.

(Continued)

*Primary Examiner* — Jamel E Williams

(74) *Attorney, Agent, or Firm* — Hanley, Flight & Zimmerman, LLC

(57) ABSTRACT

Methods and Apparatus to monitor components of an aircraft landing system are disclosed herein. An example method includes determining an initial temperature of at least one of a wheel or a fuse plug based on a temperature value to be provided by a first temperature sensor; estimating a temperature of a brake assembly based on a temperature value provided by a second temperature sensor; after determining the initial temperature, estimating a subsequent temperature of the at least one of the wheel or the fuse plug; and determining if the subsequent temperature is a peak temperature.

20 Claims, 10 Drawing Sheets

(56) References Cited

U.S. PATENT DOCUMENTS

| | | | |
|---|---|---|---|
| 5,596,513 | A | 1/1997 | Schricker |
| 6,892,778 | B2 | 5/2005 | Hennig et al. |
| 7,086,503 | B2 | 8/2006 | Miller et al. |
| 7,416,005 | B2 | 8/2008 | Hennig et al. |
| 7,497,305 | B2 | 3/2009 | Miller et al. |
| 7,506,941 | B2 | 3/2009 | Miller et al. |
| 7,901,014 | B2 | 3/2011 | Miller et al. |
| 8,151,944 | B2 | 4/2012 | Waltz |
| 8,152,246 | B2 | 4/2012 | Miller et al. |
| 8,186,403 | B2 | 5/2012 | Sonzala et al. |
| 8,223,006 | B2 | 7/2012 | Wilson et al. |
| 8,919,401 | B2 | 12/2014 | Sonzala et al. |
| 9,227,472 | B2 | 1/2016 | Sonzala et al. |
| 9,242,739 | B2 | 1/2016 | Martin |
| 9,404,806 | B2 | 8/2016 | Miller |
| 2002/0104717 | A1 | 8/2002 | Borugian |
| 2002/0195298 | A1 | 12/2002 | Borugian |
| 2004/0011596 | A1 | 1/2004 | Miller et al. |
| 2005/0052074 | A1 | 3/2005 | Hennig et al. |
| 2005/0156463 | A1 | 7/2005 | Hennig et al. |
| 2009/0125286 | A1 | 5/2009 | Waltz |
| 2009/0242092 | A1 | 10/2009 | Sonzala et al. |
| 2012/0193484 | A1 | 8/2012 | Furtwängler et al. |
| 2012/0197505 | A1 | 8/2012 | Friesen et al. |
| 2012/0212039 | A1 | 8/2012 | Sonzala et al. |
| 2014/0239121 | A1 | 8/2014 | Kirkbride et al. |
| 2014/0269824 | A1 | 9/2014 | Miller |
| 2015/0145703 | A1 | 5/2015 | Martin |
| 2015/0197124 | A1 | 7/2015 | Sonzala et al. |

FOREIGN PATENT DOCUMENTS

| | | |
|---|---|---|
| EP | 2060456 | 5/2009 |
| FR | 2534193 | 4/1984 |
| JP | H05215158 | 8/1993 |
| KR | 20090131518 | 12/2009 |

OTHER PUBLICATIONS

Rob Root, “Brake Energy Considerations in Flight Operations”, Sep. 2003, 69 pages, USA.

European Patent Office, “Search Report,” issued in connection with the European application No. 14194486, dated Apr. 8, 2015 (5 pages).

United States Patent and Trademark Office, “Ex parte Quayle,” issued in connection with U.S. Appl. No. 14/088,087, dated Apr. 3, 2015, 12 pages.

United States Patent and Trademark Office, “Notice of Allowance,” issued in connection with U.S. Appl. No. 14/088,087, dated Aug. 4, 2015, 15 pages.

United States Patent and Trademark Office, “Notice of Allowance,” issued in connection with U.S. Appl. No. 14/088,087, dated Sep. 14, 2015, 12 pages.

United States Patent and Trademark Office, “Notice of Allowance,” issued in connection with U.S. Appl. No. 13/830,109, dated Mar. 25, 2016, 15 pages.

United States Patent and Trademark Office, “Notice of Allowance,” issued in connection with U.S. Appl. No. 13/830,109, dated Feb. 29, 2016, 21 pages.

United States Patent and Trademark Office, “Final Office Action,” issued in connection with U.S. Appl. No. 13/830,109, dated Nov. 13, 2015, 22 pages.

United States Patent and Trademark Office, “Non-Final Office Action,” issued in connection with U.S. Appl. No. 13/830,109, dated Apr. 10, 2015, 27 pages.

State Intellectual Property Office of the People’S Republic of China, “Notification of First Office Action,” issued in connection with Chinese Patent Application No. 201410096116.X, dated Dec. 26, 2016, 23 pages.

State Intellectual Property Office of PRC, “Notification of Second Office Action,” issued in connection with Chinese Patent Application No. 20140096116.X, dated Aug. 14, 2017, 7 pages.

European Patent Office “Extended European Search Report,” issued in connection with European Patent Application No. 14159955.5 dated Mar. 22, 2018, 9 pages.

METHODS AND APPARATUS TO MONITOR COMPONENTS OF AN AIRCRAFT LANDING SYSTEM

CROSS-REFERENCE TO RELATED APPLICATIONS

This patent arises as a continuation application of U.S. patent application Ser. No. 13/830,109, filed on Mar. 14, 2013, entitled Methods and Apparatus to Monitor Components of an Aircraft Landing System, which is hereby incorporated herein by reference in its entirety.

FIELD

The present disclosure relates generally to aircraft landing systems and, more particularly, to methods and apparatus to monitor components of an aircraft landing system.

BACKGROUND

Generally, an aircraft includes wheels and brakes to facilitate taxiing, landing, parking, etc. When the brakes are operated, the brakes generate heat. The heat from the brakes may be transferred to the wheels. Generally, each of the wheels includes one or more fuse plugs. A fuse plug may include a seal, which melts upon reaching a threshold temperature to release air from a tire on the wheel. Conventional systems utilize only brake temperature measurements, which may not correlate to wheel temperatures in most instances due to heat shielding. These conventional systems also do not address a concern among operators of triggering wheel fuse plugs due to exceeding predetermined temperature thresholds of a wheel. As a result, an operator may subject themselves to overly conservative delay periods to compensate for insufficient data regarding actual wheel temperature. It would therefore be beneficial to provide an enhanced measurement of an existing wheel temperature and predict a future wheel temperature given a particular delay period and eventual landing.

SUMMARY

An example apparatus includes apparatus includes a temperature monitoring unit to be communicatively coupled to a first temperature sensor of at least one of a wheel or a fuse plug coupled to the wheel and a second temperature sensor of a brake assembly operatively coupled to the wheel. The temperature monitoring unit includes an initial temperature determiner to determine an initial temperature of at least one of the wheel or the fuse plug based on a temperature value to be provided by the first temperature sensor, a brake energy estimator to estimate a temperature of the brake assembly based on a temperature value provided by the second temperature sensor; a subsequent temperature estimator to estimate a subsequent temperature of at least one of the wheel or the fuse plug, the subsequent temperature to be determined after the determination of the initial temperature; and a peak temperature estimator to determine if the subsequent temperature is a peak temperature of the at least one of the wheel or the fuse plug.

An example method includes determining an initial temperature of at least one of a wheel or a fuse plug based on a temperature value to be provided by a first temperature sensor; estimating a temperature of a brake assembly based on a temperature value provided by a second temperature sensor; after determining the initial temperature, estimating a subsequent temperature of the at least one of the wheel or the fuse plug; and determining if the subsequent temperature is a peak temperature.

The features, functions and advantages that have been discussed can be achieved independently in various examples or may be combined in yet other examples further details of which can be seen with reference to the following description and drawings.

Figure 1:
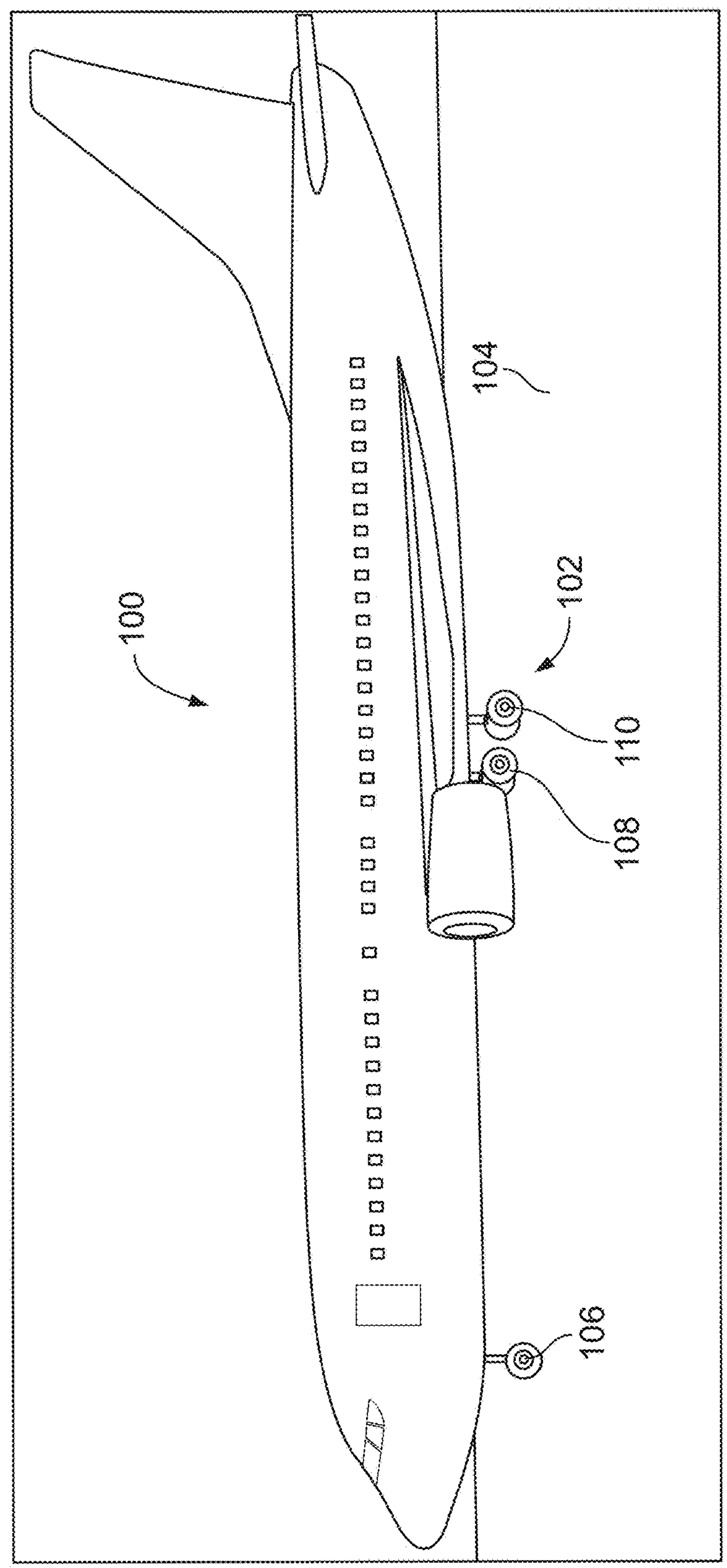
FIG. 1 illustrates an example aircraft that may be used to implement example methods and apparatus disclosed herein.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Methods and apparatus to monitor components of an aircraft landing system are disclosed herein. During a braking event of an aircraft such as, for example, landing, taxiing, parking, etc., heat is generated by brakes (e.g., rotors and stators) of a brake assembly. Heat is transferred from the brake assembly to a wheel operatively coupled to the brake assembly. The wheel may include a fuse plug, which includes a seal that melts at a threshold temperature. If the seal melts, air is released from a tire on the wheel. After one braking event or a plurality of braking events in a given period of time, a temperature of the fuse plug may increase toward the threshold temperature. The example methods and apparatus disclosed herein may be used to monitor a temperature of the wheel and/or a temperature of the fuse plug to enable an operator of the aircraft, an aircraft control system, etc. to determine when to schedule future braking events (e.g., landing at a destination) or perform one or more actions to cool the brake assembly and/or the wheel to prevent the fuse plug from melting.

Heat from the brake assembly may be transferred to the fuse plug during the braking event (e.g., as the brakes are applied during landing) and after the braking event (e.g., once the aircraft is parked). Thus, a temperature of the fuse plug may continue to increase following the braking event. In some examples, a fuse plug monitoring system includes a temperature monitoring unit in communication with a first temperature sensor disposed on the wheel and a second temperature sensor disposed on the brake assembly. In some examples, the temperature monitoring unit estimates a temperature of the fuse plug at a future time based on an initial temperature of the wheel and/or the fuse plug and a temperature of the brake assembly.

The temperature monitoring unit may determine the initial temperature of the fuse plug at a first time via the first temperature sensor. Based on the temperature of the brake assembly determined via the second temperature sensor at or near the first time, the temperature monitoring unit determines a brake energy associated with the brake assembly. Over a period of time (e.g., 30 minutes), the brake energy may be transferred to the wheel and/or the fuse plug as heat, thereby increasing a temperature of the fuse plug. In some examples, the temperature monitoring unit estimates an increase in the temperature of the fuse plug over the period of time based on the brake energy. Based on the increase in temperature, the temperature monitoring unit may estimate a subsequent temperature of the fuse plug (e.g., a temperature of the wheel and/or fuse plug at the future time such as, for example, thirty minutes from the first time).

The temperature monitoring unit may determine a peak temperature of the fuse plug. The peak temperature is a maximum temperature resulting from a braking event. If the temperature of the brake assembly is increasing or decreasing at the first time, the subsequent temperature may not be the peak temperature. To determine the peak temperature of the fuse plug, the temperature monitoring unit monitors the temperature of the brake assembly over time and identifies a peak temperature of the brake assembly at a second time. An initial temperature of the fuse plug at or near the second time and an amount of the brake energy associated with the peak temperature of the brake assembly are determined. Based on the initial temperature of the fuse plug at the second time and the brake energy, a subsequent temperature (e.g., a temperature at a future time after the second time) of the fuse plug is determined. This subsequent temperature is the peak temperature of the fuse plug as a result of a braking event. The peak temperature of the fuse plug may be used to determine if the fuse plug will melt between the second time and the future time, if initiating an action to cool the brakes and/or the wheel assembly may prevent the fuse plug from melting, a nearest time at which the aircraft may perform another braking event without melting the fuse plug, etc.

FIG. 1 illustrates an example aircraft 100, which may be used to implement methods and apparatus to monitor components of an aircraft landing system are disclosed herein. In the illustrated example, the aircraft 100 includes a landing system 102 to support the aircraft 100 on a surface 104 (e.g., a runway) and enable the aircraft 100 to taxi, take off, land, etc. The example landing system 102 includes a front landing gear unit 106 and two rear landing gear units 108 and 110. However, the above-noted numbers of front and rear landing units are merely examples and, thus, other examples may employ other numbers of front landing gear units and/or rear landing gear units without departing from the scope of this disclosure.

To travel from one destination (e.g., airport) to another, the example aircraft 100 may perform a plurality of braking events such as, for example, taxiing from a departure gate to a runway, landing, taxiing from a runway to an arrival gate, and parking. During a given time period (e.g., one day), the example aircraft 100 may travel or be scheduled to travel to a plurality of destinations and, thus, perform or be scheduled to perform a plurality of braking events.

Figure 2:
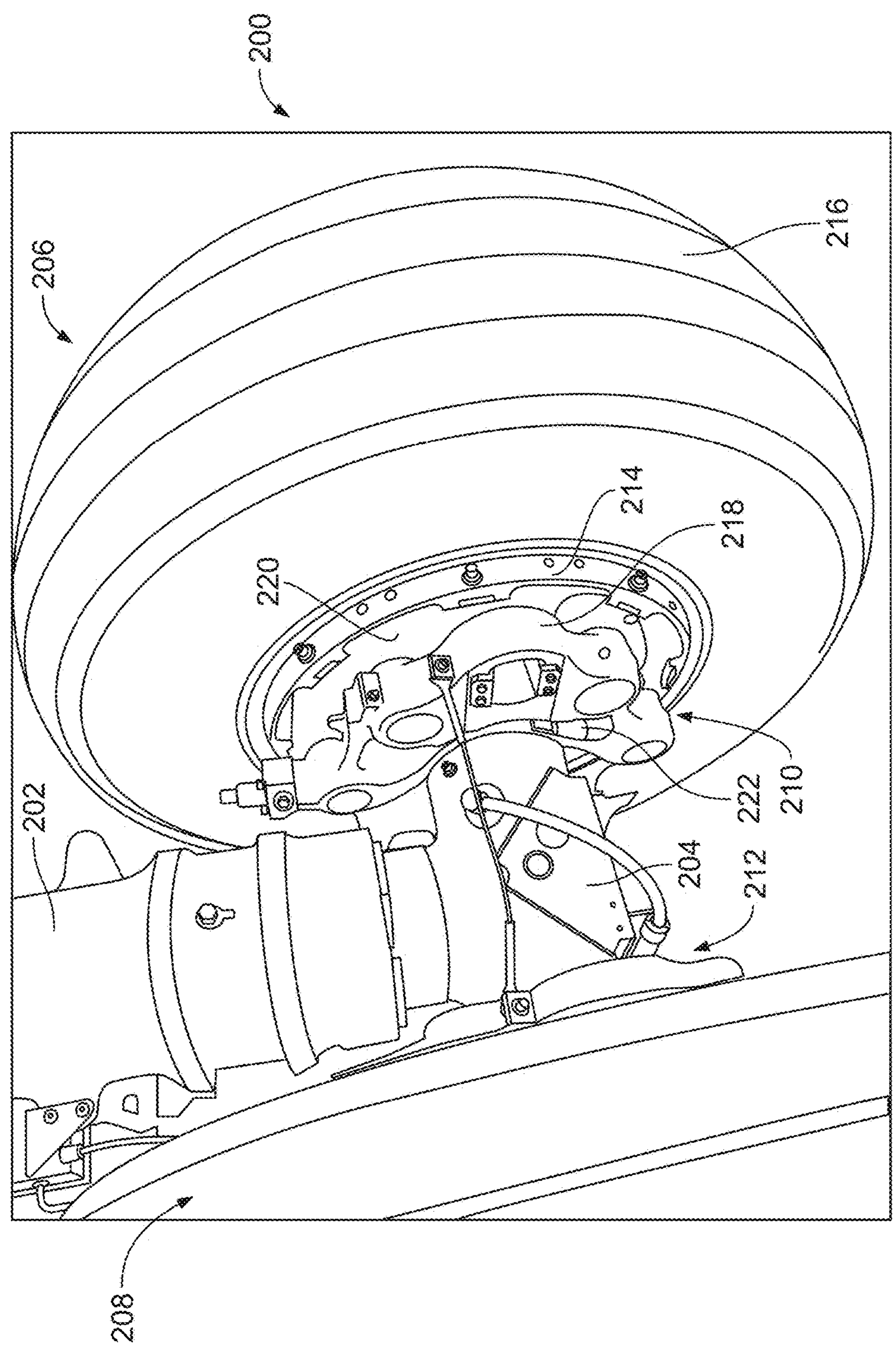
FIG. 2 illustrates an example aircraft landing system of the aircraft of FIG. 1.

FIG. 2 illustrates an example landing gear unit 200, which may be used to implement the landing system 102 of the example aircraft 100 of FIG. 1. In the illustrated example, the landing gear unit 200 includes a strut 202, an axle assembly 204, two wheel assemblies 206 and 208, and two brake assemblies 210 and 212. Each of the brake assemblies 210 and 212 is coupled to the axle assembly 204 and a respective one of the wheel assemblies 206 and 208. The example landing gear unit 200 may include a plurality of actuators, sensors and/or other devices, which may be controlled by and/or communicate with one or more aircraft control systems of the example aircraft 100.

The wheel assemblies 206 and 208 of the example landing gear unit 200 are substantially similar, and the brake assemblies 210 and 212 of the example landing gear unit 200 are substantially similar. Thus, the following description of the brake assembly 210 and the wheel assembly 206 disposed on a right side of the strut 202 in the orientation of FIG. 2 is applicable to the brake assembly 212 and the wheel assembly 208 disposed on a left side of the strut 202 in the orientation of FIG. 2. Therefore, to avoid redundancy, the wheel assembly 208 and the brake assembly 212 on the left side of the strut 202 in the orientation of FIG. 2 are not separately described.

In the illustrated example, wheel assembly 206 includes a wheel 214 and a tire 216. The example brake assembly 210 includes a housing 218, brakes (e.g., one or more rotors and stators), pistons and/or other components. In the illustrated example, the brakes are received in a tubewell 220 of the wheel 214. When the brake assembly 210 is operated, the brakes convert kinetic energy of the wheel 214 into brake energy (e.g., heat energy). As a result, a temperature of the brake assembly 210 increases. In the illustrated example, a brake temperature sensor 222 (e.g., a thermocouple) is coupled to the landing gear unit 200 to acquire information related to the temperature of the brake assembly 210 ("brake temperature information"). The example brake temperature sensor 222 of FIG. 2 is disposed on the housing 218 of the brake assembly 210. In other examples, the brake temperature sensor 222 may be coupled to other components of the brake assembly 210, the axle assembly 204, the strut 202, the wheel 214, and/or any other suitable component of the landing gear unit 200. As described in greater detail below, the temperature of the brake assembly 210 may be used to estimate an amount of brake energy that may be absorbed by the wheel 214 and/or a fuse plug 300 (FIG. 3) disposed on the wheel 214 as a result of a braking event.

Figure 3:
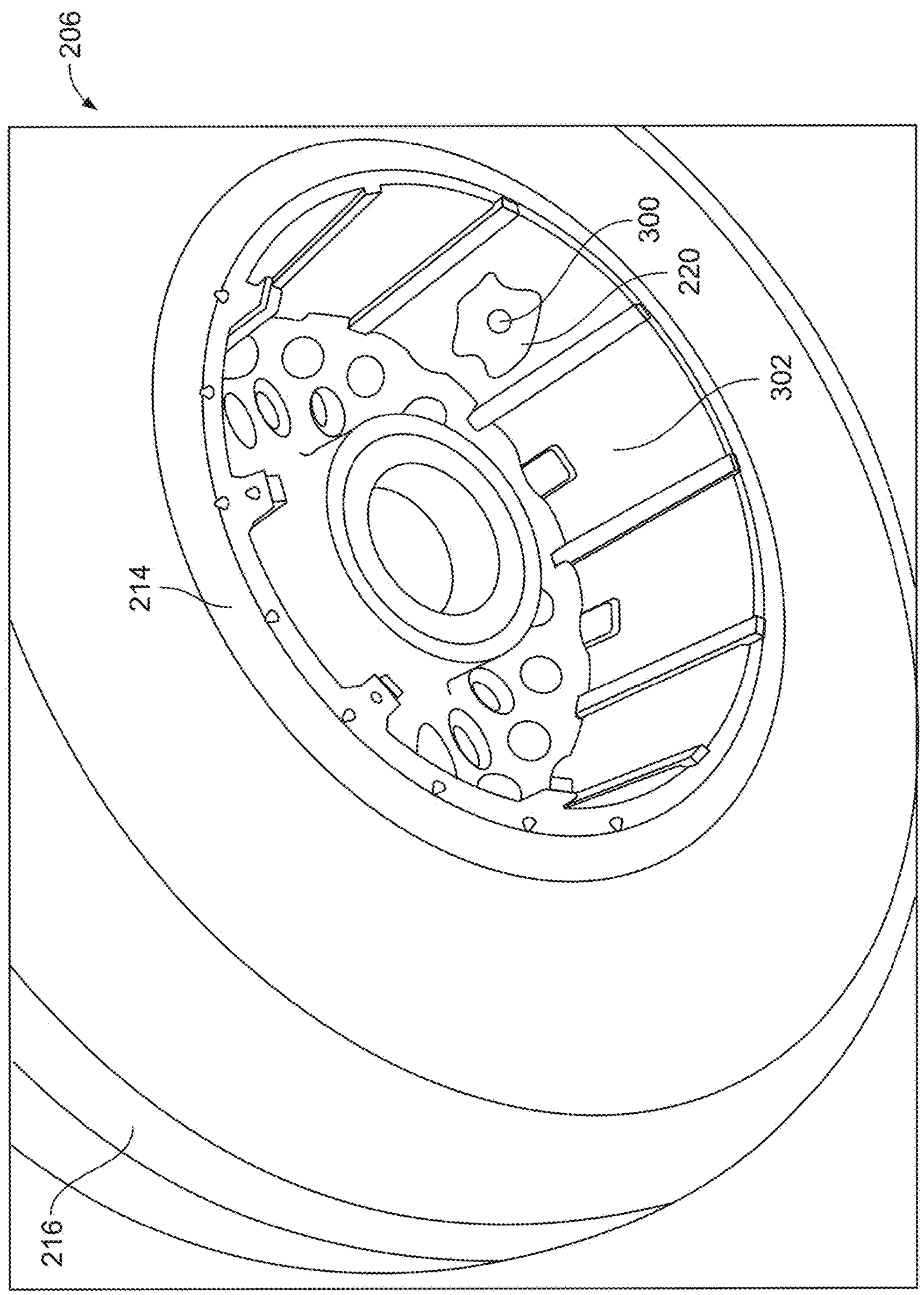
FIG. 3 illustrates an example wheel assembly of the aircraft landing system of FIG. 2.

FIG. 3 is a perspective view of a first side of the example wheel assembly 206 of FIG. 2. In the illustrated example, the wheel 214 includes the fuse plug 300. The example fuse plug 300 is coupled to the wheel 214 via the tubewell 220. Although one fuse plug is shown in the illustrated example, the wheel 214 may include a plurality of fuse plugs, which may be spaced apart along the wheel 214 (e.g., three fuse plugs radially spaced apart by about 120 degrees).

The example fuse plug 300 of FIG. 3 is in communication with the interior space of the tire 216 between the wheel 214 and the tire 216. When a temperature of the fuse plug 300 is below a threshold temperature, the fuse plug 300 enables the tire 216 to be inflated and/or pressurized. If the temperature of the fuse plug 300 reaches or exceeds the threshold temperature, a portion (e.g., a eutectic core) of the fuse plug 300 melts to release air from in the tire 216.

The example wheel assembly 206 includes a heat shield 302 coupled to the wheel 214. The example heat shield 302 is disposed between the brake assembly 210 and the wheel 214 to prevent and/or mitigate convective and/or radiative heat transfer from the brake assembly 210 to the wheel 214 and the fuse plug 300.

Figure 4:
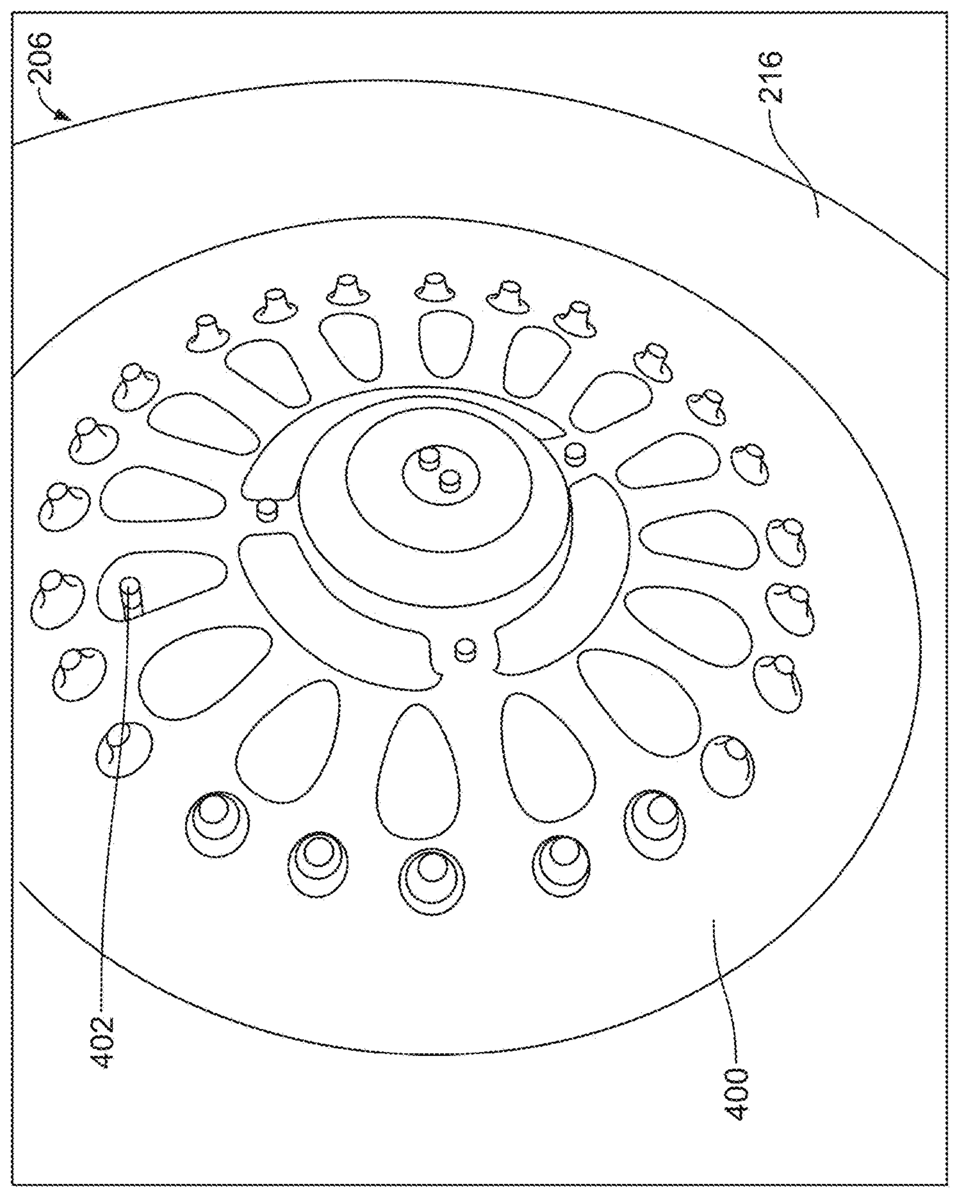
FIG. 4 illustrates a tire inflation valve disposed on the example wheel assembly of FIG. 3.

FIG. 4 is a perspective view of a second side of the example wheel assembly 206 of FIGS. 2-3. In the illustrated example, the wheel assembly 206 includes a cap 400 coupled to the wheel 214. The wheel assembly 206 also includes a tire inflation valve 402. Air may be flowed into the tire 216 via the tire inflation valve 402 to inflate the tire 216 and/or pressurize the tire 216.

Figure 5:
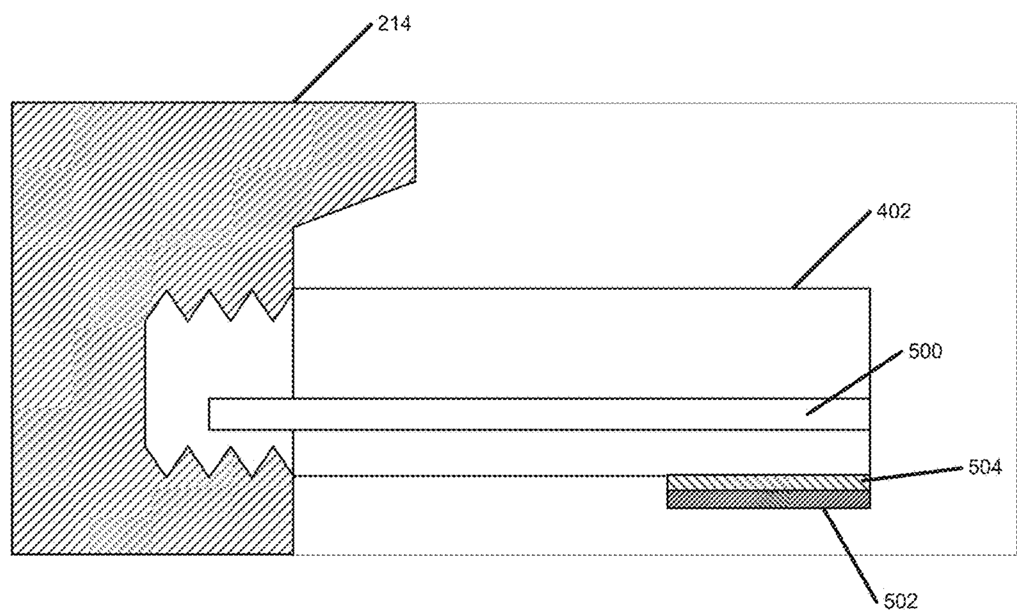
FIG. 5 is a cross-sectional view of the example tire inflation valve of FIG. 4.

FIG. 5 is a cross-sectional view of the example wheel 214 and the example tire inflation valve 402 of FIG. 4. In the illustrated example, a wheel temperature sensor 500 (e.g., a thermocouple) is disposed in the tire inflation valve 402. In other examples, the wheel temperature sensor 500 is disposed in and/or on other portions of the wheel assembly 206 (e.g., the cap 400, the tubewell 220 of the wheel 214, a rim of the wheel 214, etc.). The wheel temperature sensor 500 acquires information related to a temperature of the wheel 214 ("wheel temperature information"). As described in greater detail below, the temperature of the wheel 214 and the temperature of the brake assembly 210 may be used to estimate a peak temperature of the fuse plug 300 as a result of a braking event.

In the illustrated example, a position sensor 502 (e.g., an accelerometer) is coupled to the tire inflation valve 402. The position sensor 502 may be used to determine and/or monitor a rotational position of the tire inflation valve 402 and, thus, the wheel temperature sensor 500. In the illustrated example, the position sensor 502 is coupled to the tire inflation valve 402 via thermal insulation 504.

Figure 6:
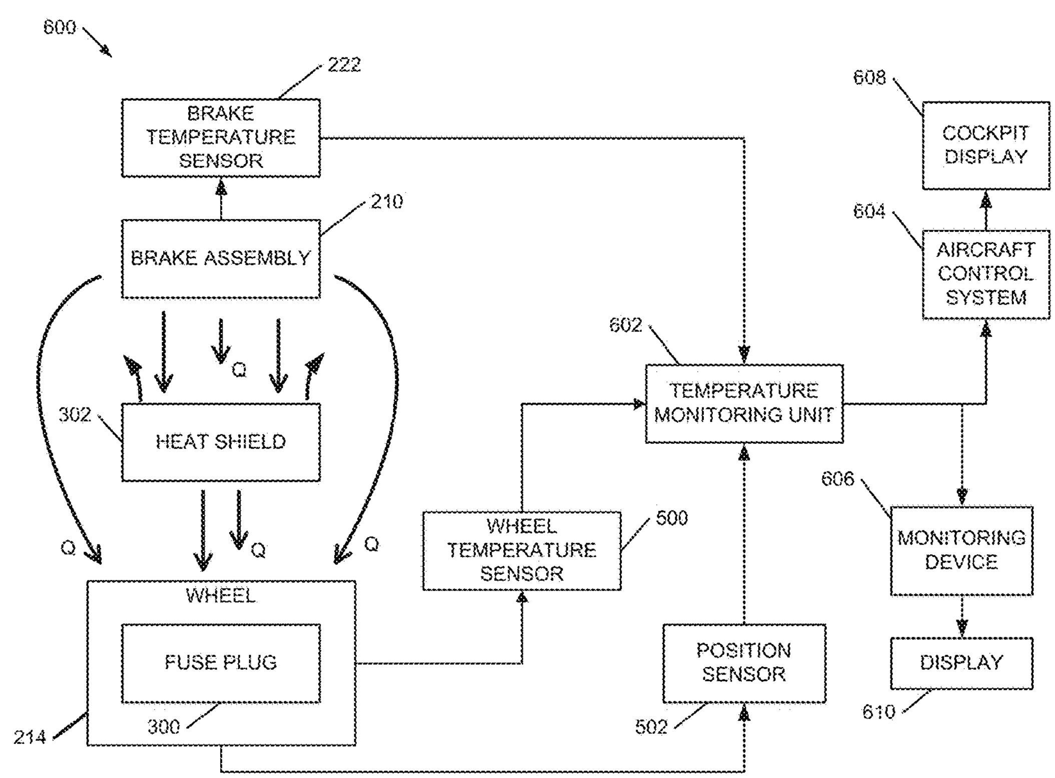
FIG. 6 is a block diagram of an example fuse plug monitoring system.

FIG. 6 is a block diagram of an example fuse plug monitoring system 600 disclosed herein. The example fuse plug monitoring system 600 includes a temperature monitoring unit 602 in communication with the brake temperature sensor 222, the wheel temperature sensor 500 and the position sensor 502 of FIGS. 2-5. The example temperature monitoring unit 602 determines peak temperatures of the wheel 214 and/or the fuse plug 300 resulting from one or more braking events performed by the example aircraft 100. The temperature monitoring unit 602 may be implemented by and/or in communication with an aircraft control system 604 disposed on the aircraft 100 or a monitoring device 606 disposed outside of the aircraft 100 (e.g., a portable or handheld device (e.g., a laptop, a smartphone, a portable diagnostic tool, etc.), a workstation (e.g., located in a maintenance facility, a ground control facility, etc.), and/or any other suitable device and/or system. The example temperature monitoring unit 602 may operate while the aircraft 100 is on the surface 104 of Earth and/or in flight.

During operation of example aircraft 100, the wheel temperature sensor 500 communicates the wheel temperature information to the temperature monitoring unit 602. The example position sensor 502 communicates the position information to the temperature monitoring unit 602. In the illustrated example, based on the position information, the temperature monitoring unit 602 determines a rotational position of the fuse plug 300 relative to the rotational position of the wheel temperature sensor 500. Because heat Q generally rises, if the fuse plug 300 is disposed above the wheel temperature sensor 500 relative to the surface 104 of Earth, a temperature of the fuse plug 300 may be greater than a temperature of the wheel 214 determined via the wheel temperature sensor 500. If the fuse plug 300 is disposed below the wheel temperature sensor 500 relative to the surface 104 of Earth, the temperature of the fuse plug 300 may be less than the temperature of the wheel 214 determined via the wheel temperature sensor 500. In some examples, the fuse plug 300 is assumed to be at a highest point on the wheel 214 relative to the surface 104 of Earth. Thus, based on the wheel temperature information and the position information, the temperature monitoring unit 602 determines an initial temperature of the fuse plug 300. The initial temperature is a temperature at a first time.

During a braking event, kinetic energy is converted into brake energy via the brake assembly 210. As a result, heat Q is generated by the brake assembly 210. The heat Q may be transferred from the brake assembly 210 to the axle assembly 204, the heat shield 302, the wheel 214, the fuse plug 300, and/or other components of the landing gear unit 200. As a result, a temperature of the wheel 214 and/or a temperature of the fuse plug 300 may increase during the braking event. After the braking event has concluded (e.g., upon takeoff, once the aircraft 100 is parked, etc.), the wheel 214 and the fuse plug 300 may continue to absorb heat energy generated by the brake assembly 210. As a result, the temperatures of the wheel 214 and the fuse plug 300 may increase until a given amount of time after the braking event has concluded.

The example brake temperature sensor 222 communicates brake temperature information to the temperature monitoring unit 602. Based on the brake temperature information, the temperature monitoring unit 602 determines a temperature of the brake assembly 210. Based on the temperature of the brake assembly 210, the temperature monitoring unit 602 estimates an amount of brake energy to be transferred from the brake assembly 210 to the wheel 214 and/or the fuse plug 300. In some examples, the temperature monitoring unit 602 further determines an estimated temperature increase of the wheel 214 and/or the fuse plug 300 over a predetermined amount of time (e.g., thirty minutes) based on the brake energy. Based on the initial temperature of the wheel 214 and/or the fuse plug 300 and the estimated temperature increase, the temperature monitoring unit 602 estimates a subsequent temperature of the wheel 214 and/or fuse plug 300. The subsequent temperature is a temperature at a future time subsequent to the first time.

In some examples, the temperature monitoring unit 602 determines if the subsequent temperature of the wheel 214 and/or the fuse plug 300 is a peak temperature of the wheel 214 and/or the fuse plug 300. The peak temperature is a maximum temperature resulting from a braking event. The peak temperature of the wheel 214 and/or the fuse plug 300 is determined based on a peak temperature of the brake assembly 210 as a result of the braking event. For example, if the temperature of the brake assembly 210 is increasing or decreasing at the first time, the temperature monitoring unit 602 may determine that the subsequent temperature (determined based on the initial temperature at the first time) is not the peak temperature of the wheel 214 and/or the fuse plug 300. Once the brake assembly 210 reaches the peak temperature at a second time, a maximum amount of brake energy to be transferred to the wheel 214 and/or the fuse plug 300 as a result of the braking event is determined based on the peak temperature of the brake assembly 210. Using the initial temperature of the wheel 214 and/or the fuse plug 300 at the second time and the maximum amount of the brake energy, the peak temperature of the wheel 214 and/or the fuse plug 300 is determined.

Based on the subsequent temperature, the temperature monitoring unit 602 may generate and/or communicate a message. In some examples, the message may indicate that the temperature of the fuse plug 300 has or will exceed the threshold temperature. In some examples, the message includes the initial temperature of the fuse plug 300, the subsequent temperature of the fuse plug 300, an amount of time until the fuse plug 300 reaches the subsequent temperature, an indication that the subsequent temperature is the peak temperature, one or more recommended actions (e.g., in-flight gear extension, in-flight gear retraction, forced brake cooling, initiate brake cooling schedule, etc.). The recommended action may be based on the initial and/or the subsequent temperature of the fuse plug 300, and/or other information. In some examples, the message is displayed via a cockpit display 608, a display 610 of the monitoring device 606, and/or any other suitable display.

Figure 7:
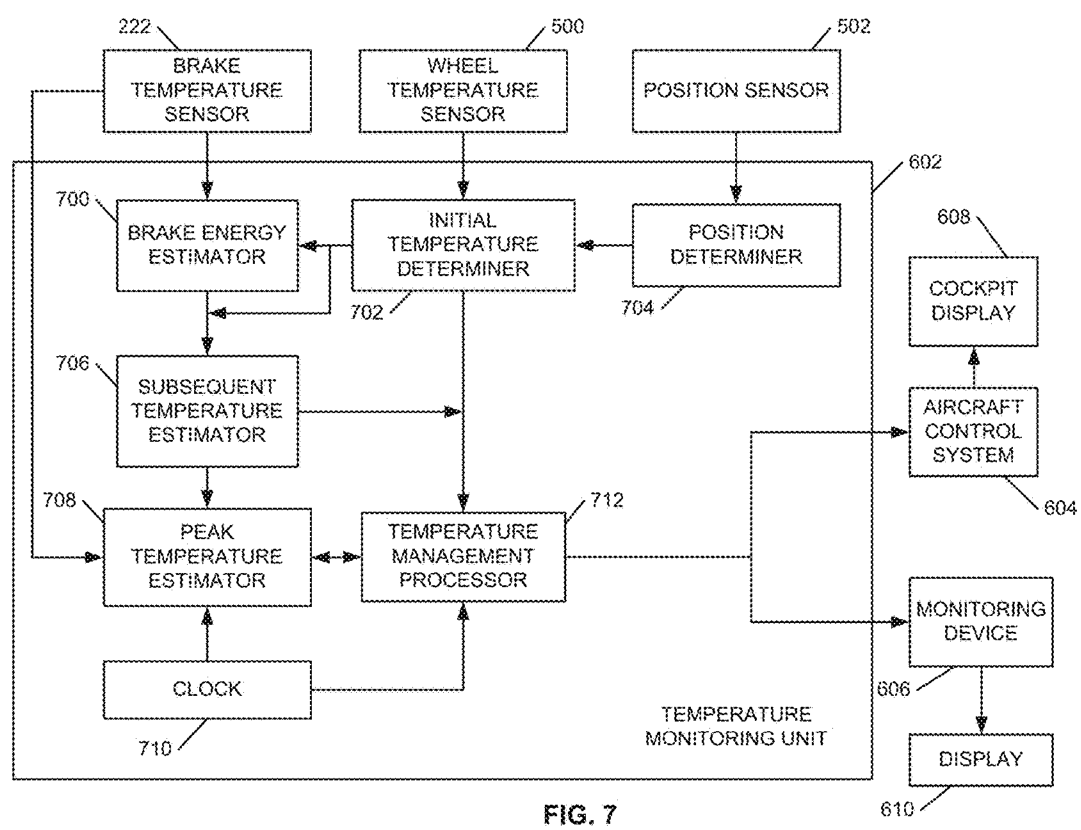
FIG. 7 is a block diagram of a temperature monitoring unit of the example fuse plug monitoring system of FIG. 6.

FIG. 7 is a block diagram of the example temperature monitoring unit 602 of FIG. 6. The example temperature monitoring unit 602 includes a brake energy estimator 700, an initial temperature determiner 702, a position determiner 704, a subsequent temperature estimator 706, a peak temperature estimator 708, a clock 710 and a temperature management processor 712.

The example initial temperature determiner 702 receives wheel temperature information from the wheel temperature sensor 500. Based on the wheel temperature information, the example initial temperature determiner 702 determines an initial temperature of the wheel 214 and/or the fuse plug 300. In some examples, the initial temperature of the fuse plug 300 is a function of the initial temperature of the wheel 214. For example, the initial temperature of the fuse plug may be determined using the following equation:

$$T_{FP\ initial}=C_1\cdot T_W \qquad \text{Equation 1:}$$

In Equation 1, $T_{FP\ initial}$ is the initial temperature of the fuse plug 300, $T_W$ is the initial temperature of the wheel 214, and $C_1$ is a correlation coefficient. In some examples, $C_1$ is determined experimentally. The initial temperature is a temperature of the fuse plug 300 at a first time such as, for example, during a braking event, at a conclusion of the braking event, after the braking event, and/or any other suitable time.

In some examples, the initial temperature determiner 702 determines the initial temperature of the fuse plug 300 based on a rotational position of the wheel temperature sensor 500 relative to a rotational position of the fuse plug 300. More specifically, the example position determiner 704 of FIG. 7 determines a rotational position of the wheel temperature sensor 500 based on position information received via the position sensor 502. In some examples, to determine the rotational position of the wheel temperature sensor 500 relative to the rotational position of the fuse plug 300, the rotational position of the fuse plug 300 is assumed to be at a highest point on the wheel 214 relative to the surface 104 of Earth. If the fuse plug 300 is disposed above the wheel temperature sensor 500 relative to the surface 104 of Earth, the initial temperature determiner 702 may determine that the initial temperature of the fuse plug 300 is greater than the temperature of the wheel 214 by an amount that is a function of a difference between the rotational position of the fuse plug 300 and the rotational position of the wheel temperature sensor 500. In some examples, a relationship between the initial temperature of the fuse plug 300, the temperature of the wheel 214, and the difference between the rotational position of the fuse plug 300 and the rotational position of the wheel temperature sensor 500 is determined experimentally.

The example brake energy estimator 700 receives brake temperature information from the brake temperature sensor 222. Based on the brake temperature information, the example brake energy estimator 700 estimates a temperature of the brake assembly 210. In some examples, the brake energy estimator 700 receives the initial temperature of the wheel 214 and/or the fuse plug 300 from the initial temperature determiner 702. Based on the temperature of the brake assembly 210 and the initial temperature of the wheel 214 and/or the fuse plug 300, the brake energy estimator 700 determines an amount of brake energy (e.g., heat) that will be transferred to the wheel 214 and/or the fuse plug 300 from the brake assembly 210. In some examples, the amount of brake energy is a function of the temperature of the wheel 214 and a state of wear of the brakes. For example, the brake energy may be determined using the following equation:

$$BE=T_W\cdot F_{BWS}\cdot F_{TE}. \qquad \text{Equation 2:}$$

In Equation 2, BE is the brake energy, $T_W$ is the temperature of the wheel 214, $F_{BWS}$ is a brake wear state correlation factor, and $F_{TE}$ is a correlation factor between the temperature of the brake assembly 210 and the brake energy. In some examples, the brake wear state correlation factor, $F_{BWS}$, is a constant corresponding to the state of wear of the brakes (e.g., new, 50% worn, fully worn, etc.). In some examples, the state of wear of the brakes is assumed to be a fully worn state. The correlation factor between the temperature of the brake assembly 210 and the brake energy, $F_{TE}$, may be determined empirically (e.g., based on experimentally determined data) or theoretically (e.g., by calculating the correlation factor using a mathematical formula based on a material of a heat sink corresponding to the brake assembly 210 and a mass of the heat sink).

The example subsequent temperature estimator 706 of FIG. 7 estimates a subsequent temperature of the wheel 214 and/or the fuse plug 300. The subsequent temperature is a temperature at a future time after the first time such as, for example, thirty minutes after the first time. In the illustrated example, the subsequent temperature estimator 706 estimates an increase in temperature of the wheel 214 and/or the fuse plug 300 from the first time to the future time based on the brake energy to be transferred to the wheel 214 and/or the fuse plug 300. Based on the initial temperature and the estimated increase in temperature, the subsequent temperature estimator 706 estimates the subsequent temperature of the wheel 214 and/or the fuse plug 300 (e.g., by summing the estimated increase in temperature and the initial temperature). For example, the subsequent temperature of the fuse plug 300 may be determined using on the following Equation:

$$T_{FP,\ subsequent}=\Delta T_{FP}+T_{FP\ initial}, \text{ where } \Delta T_{FP}=(F_{BE,\Delta FP}\cdot BE). \qquad \text{Equation 3:}$$

In Equation 3, $T_{FP,\ subsequent}$ is the subsequent temperature of the fuse plug 300; $\Delta T_{FP}$ is the estimated increase in temperature of the fuse plug 300; $T_{FP\ initial}$ is the initial temperature of the fuse plug 300; $F_{BE,\Delta FP}$ is a correlation factor between the brake energy and the estimated increase in temperature of the fuse plug 300; and BE is the brake energy. In some examples, $F_{BE,\Delta FP}$ is a function of the initial fuse plug temperature, and $F_{BE,\Delta FP}$ may be determined experimentally.

The example peak temperature estimator 708 of FIG. 7 determines if the subsequent temperature is a peak temperature of the wheel 214 and/or the fuse plug 300. In the illustrated example, the peak temperature estimator 708 monitors the brake temperature information acquired via the brake temperature sensor 222 to determine if the brake temperature is increasing, decreasing or substantially constant at the first time. In some examples, the clock 710 provides timing information to the example peak temperature estimator 708 to enable the peak temperature estimator 708 to determine a rate of change of the brake temperature.

If the brake temperature is increasing at the first time (e.g., during a braking event), the peak temperature estimator 708 determines that the subsequent temperature is below the peak fuse plug temperature. If the brake temperature is decreasing at the first time (e.g., while the aircraft 100 is in flight), the subsequent temperature estimator 706 determines that the subsequent temperature is below the peak temperature. If the brake temperature is substantially constant at the first time, the peak temperature estimator 708 determines that that subsequent temperature is the peak temperature.

In some examples, the peak temperature estimator 708 determines the peak temperature of the wheel 214 and/or the fuse plug 300 based on a peak brake temperature resulting from a braking event. The peak temperature estimator 708 may determine the peak brake temperature by identifying a highest brake temperature prior to the brake temperature decreasing. In some examples, the peak temperature estimator 708 determines the peak brake temperature by determining the brake temperature when the rate of change of the brake temperature is substantially zero (e.g., the brake temperature is constant).

The example temperature monitoring unit 602 of FIG. 7 includes a temperature management processor 712, which receives information from the clock 710, the initial temperature determiner 702, the subsequent temperature estimator 706, and the peak temperature estimator 708. In the illustrated example, the temperature management processor 712 determines if the subsequent temperature is at or above a threshold temperature. For example, the temperature management processor 712 may determine if the subsequent temperature of the fuse plug 300 is within a predetermined temperature of the melting point of the fuse plug 300.

In some examples, the temperature management processor 712 generates and/or communicates one or more messages to the aircraft control system 604 and/or the monitoring device 606. In some examples, if the subsequent temperature is at or above the threshold temperature, the temperature management processor 712 may generate and/or communicate a message indicating that the fuse plug temperature has exceeded or will exceed the threshold temperature in a given amount of time. In some examples, the message includes the initial temperature of the fuse plug 300, the subsequent temperature of the fuse plug 300, an amount of time until the fuse plug 300 reaches the threshold temperature and/or the subsequent temperature, an indication that the subsequent temperature is the peak temperature, one or more recommended actions (e.g., in-flight gear extension, in-flight gear retraction, forced brake cooling, initiate brake cooling schedule, etc.), and/or other information.

While an example manner of implementing the temperature monitoring unit 602 of FIG. 6 has been illustrated in FIG. 7, one or more of the elements, processes and/or devices illustrated in FIG. 7 may be combined, divided, re-arranged, omitted, eliminated and/or implemented in any other way. Further, the brake energy estimator 700, the initial temperature determiner 702, the position determiner 704, the subsequent temperature estimator 706, the peak temperature estimator 708, the clock 710 and the temperature management processor 712 and/or, more generally, the temperature monitoring unit 602 of FIG. 7 may be implemented by hardware, software, firmware and/or any combination of hardware, software and/or firmware. Thus, for example, any of the brake energy estimator 700, the initial temperature determiner 702, the position determiner 704, the subsequent temperature estimator 706, the peak temperature estimator 708, the clock 710 and the temperature management processor 712 and/or, more generally, the temperature monitoring unit 602 of FIG. 7 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the brake energy estimator 700, the initial temperature determiner 702, the position determiner 704, the subsequent temperature estimator 706, the peak temperature estimator 708, the clock 710 and the temperature management processor 712 and/or, more generally, the temperature monitoring unit 602 of FIG. 7 are hereby expressly defined to include a tangible computer readable medium such as a memory, DVD, CD, Blu-ray, etc. storing the software and/or firmware. Further still, the example temperature monitoring unit 602 of FIG. 7 may include one or more elements, processes and/or devices in addition to, or instead of, those illustrated in FIG. 7, and/or may include more than one of any or all of the illustrated elements, processes and devices.

Figure 8:
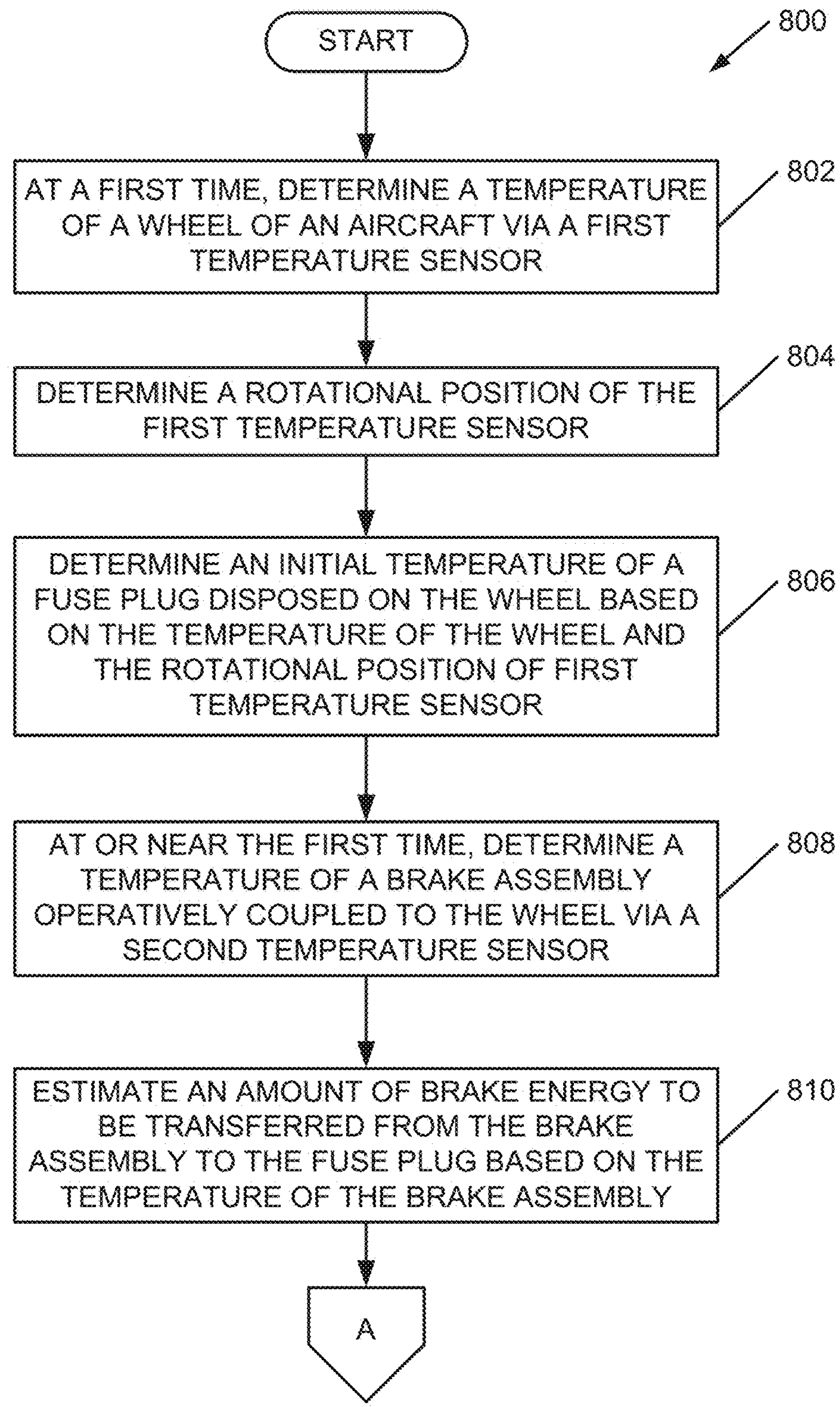
FIGS. 8-9 are a flow diagram of an example method disclosed herein.
Figure 9:
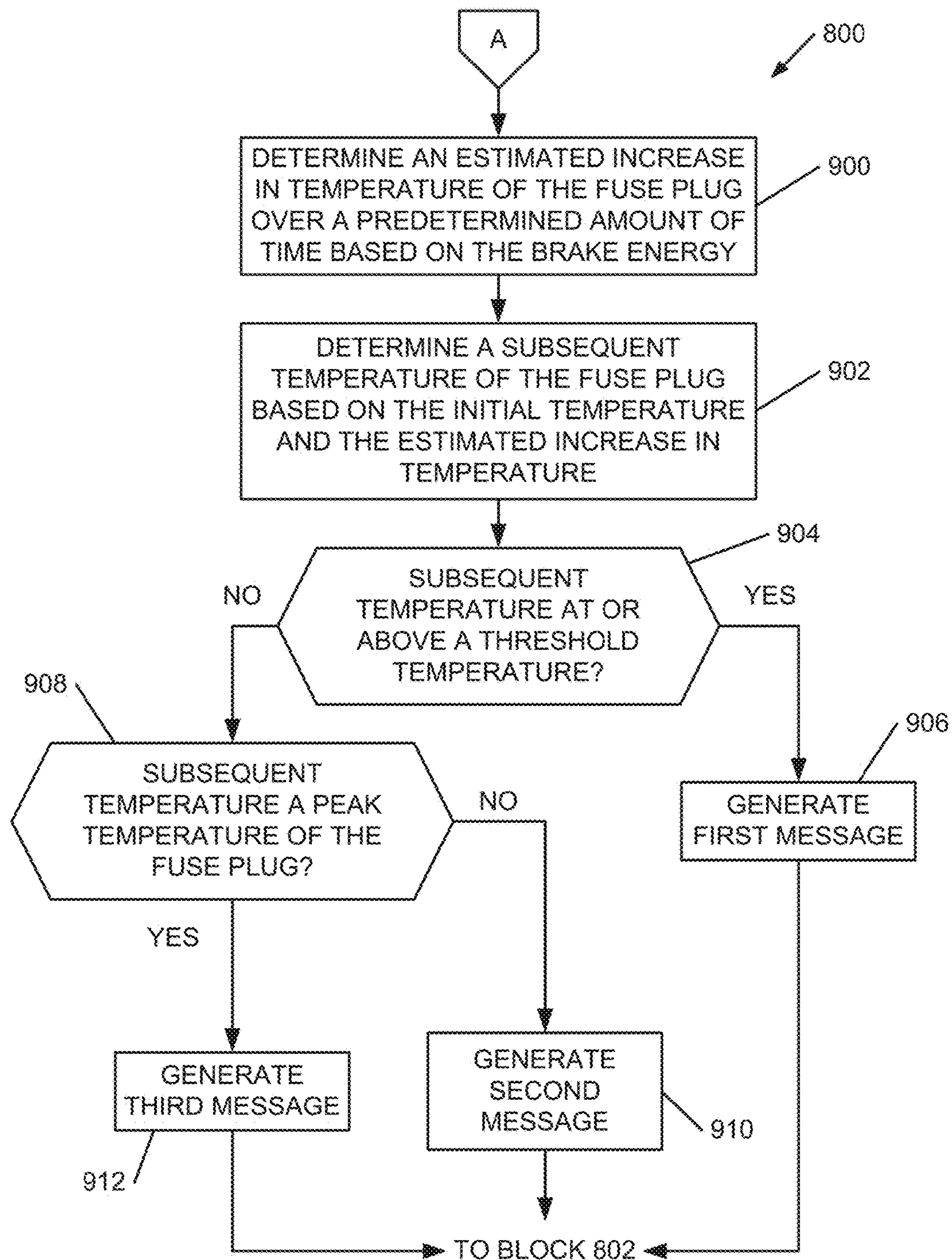

FIGS. 8-9 depict an example flowchart representative of a method or process that may be implemented using, for example, computer readable instructions. The example method of FIGS. 8-9 may be performed using a processor, a controller (e.g., the example aircraft control system 604 of FIGS. 6-7) and/or any other suitable processing device. For example, the example method of FIGS. 8-9 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example method of FIGS. 8-9 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example method of FIGS. 8-9 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more operations depicted in FIGS. 8-9 may be implemented manually or as any combination(s) of any of the foregoing techniques, for example, any combination of firmware, software, discrete logic and/or hardware.

Further, although the example method of FIGS. 8-9 is described with reference to the flow diagrams of FIG. 8-9, respectively, other implementations of the method of FIGS. 8-9 may be employed. For example, the order of execution of the blocks may be changed, and/or some of the blocks described may be changed, eliminated, sub-divided, or combined. Additionally, one or more of the operations depicted in FIGS. 8-9 may be performed sequentially and/or in parallel by, for example, separate processing threads, processors, devices, discrete logic, circuits, etc.

FIGS. 8-9 illustrate a flowchart representative of an example method 800 that can be performed to monitor components of an aircraft landing system. The example method 800 may be implemented using the example temperature monitoring unit 602 of FIGS. 6 and 7. The example method may be initiated at predetermined intervals of time, substantially continuously, or in response to a detected event and/or a condition being met (e.g., touchdown from flight, conclusion of a braking event, operation of the brake assembly 210, a manual input, etc.). The example method 800 may be performed while the aircraft 100 is supported on the surface 104 of Earth (e.g., parked, taxiing, etc.) and/or in flight.

The example method 800 of FIGS. 8-9 begins by determining a temperature of the wheel 214 of the aircraft 100 via a first temperature sensor (e.g., the wheel temperature sensor 500 of FIG. 5) at a first time (block 802). For example, the initial temperature determiner 702 may determine the temperature of the wheel 214 based on the wheel temperature information received via the wheel temperature sensor 500 disposed in the tire inflation valve 402. In some examples, the first temperature sensor may be disposed in and/or on the tubewell 220, the cap 400, and/or any other suitable portion of the wheel 214 and/or the wheel assembly 206. The position determiner 704 determines a rotational position of the first temperature sensor (block 804). In some examples, the position determiner 704 determines the rotational position of the first temperature sensor relative to a rotational position of the fuse plug 300. Based on the temperature of the wheel 214 and the rotational position of the first temperature sensor, the initial temperature determiner 702 determines an initial temperature of the fuse plug 300 disposed on the wheel 214 (block 806). In some examples, the initial temperature determiner 702 may determine that the initial temperature of the fuse plug 300 is greater than the temperature of the wheel 214 if the fuse plug 300 is disposed above the first temperature sensor relative to the surface 104 of Earth. A difference between the temperature of the wheel 214 and the initial temperature of the fuse plug 300 is a function of the rotational position of the first temperature sensor relative to the rotational position of the fuse plug 300.

At or near the first time, a temperature of the brake assembly 210 operatively coupled to the wheel 214 is determined via a second temperature sensor (e.g., the brake temperature sensor 222 of FIG. 2) (block 808). For example, the brake energy estimator 700 of the example temperature monitoring unit 602 of FIG. 7 may determine the temperature of the brake assembly 210 based on brake temperature information received via the brake temperature sensor 222 disposed on the housing 218 of the brake assembly 210. In other examples, the second temperature sensor may be disposed on the landing gear unit 200 near the brake assembly 210 (e.g., on the axle assembly 204, strut 202, etc.) and/or on other components of the brake assembly 210. Based on the temperature of the brake assembly 210, the brake energy estimator 700 estimates an amount of brake energy to be transferred from the brake assembly 210 to the fuse plug 300 (block 810).

Turning to FIG. 9, the subsequent temperature estimator 706 determines an estimated increase in the temperature of the fuse plug 300 over a predetermined amount of time based on the brake energy (block 900). The subsequent temperature estimator 706 determines a subsequent temperature of the fuse plug 300 based on the initial temperature of the fuse plug 300 and the estimated increase in temperature of the fuse plug 300 (block 902). In the illustrated example, the subsequent temperature is a temperature at a future time after the first time (e.g., the predetermined amount of time after the first time).

The temperature management processor 712 determines if the subsequent temperature is at or above a threshold temperature (block 904). For example, the temperature management processor 712 may determine if the subsequent temperature is at or above a temperature at which the fuse plug 300 melts. If the fuse plug 300 is at or above the threshold temperature, the temperature management processor 712 generates a first message (block 906). For example, the temperature management processor 712 may generate a message including the subsequent temperature, a warning, a recommended action, etc. In some examples, the temperature management processor 712 selects the recommended action (e.g., from a table or database) based on the subsequent temperature. For example, if the subsequent temperature is at or near the temperature at which the fuse plug 300 melts, the temperature management processor 712 may select a recommended action such as, for example, initiation of a brake cooling schedule (e.g., in which the aircraft 100 is to be parked for a predetermined amount of time).

If the subsequent temperature is below the threshold temperature, the peak temperature estimator 708 determines if the subsequent temperature is a peak temperature of the fuse plug 300 (block 908). In some examples, the peak temperature estimator 708 determines if the subsequent temperature is the peak temperature based on a rate of change of the brake assembly temperature at or near the first time. For example, if the brake assembly temperature is increasing at the first time, the peak temperature estimator 708 determines that the subsequent temperature is less than the peak temperature and, thus, is not the peak temperature. In some examples, if the brake assembly temperature is identified as a maximum temperature of the brake assembly 210 prior to a decrease in the brake assembly temperature, the subsequent temperature is determined to be the peak temperature. If the subsequent temperature is not the peak temperature, the temperature management processor 712 generates a second message (block 910). The second message may include the brake temperature, the initial fuse plug temperature, the subsequent fuse plug temperature, an indication that the fuse plug temperature is not the peak temperature, a recommended action (e.g., initiate brake cooling schedule, proceed to a destination, etc.), and/or any other information. If the subsequent temperature is a peak temperature of the fuse plug 300, the temperature management processor 712 generates a third message (block 912). The third message may include any information related to the fuse plug 300, a recommended action (e.g., initiate brake cooling schedule, proceed to a destination, etc.) and/or any other information. The first message, the second message and/or the third message may be communicated to the aircraft control system 604, the monitoring device 606, and/or any other suitable system and/or device. In the illustrated example, once the first message, the second message or the third message is generated, communicated and/or displayed, the example method returns to block 802.

Figure 10:
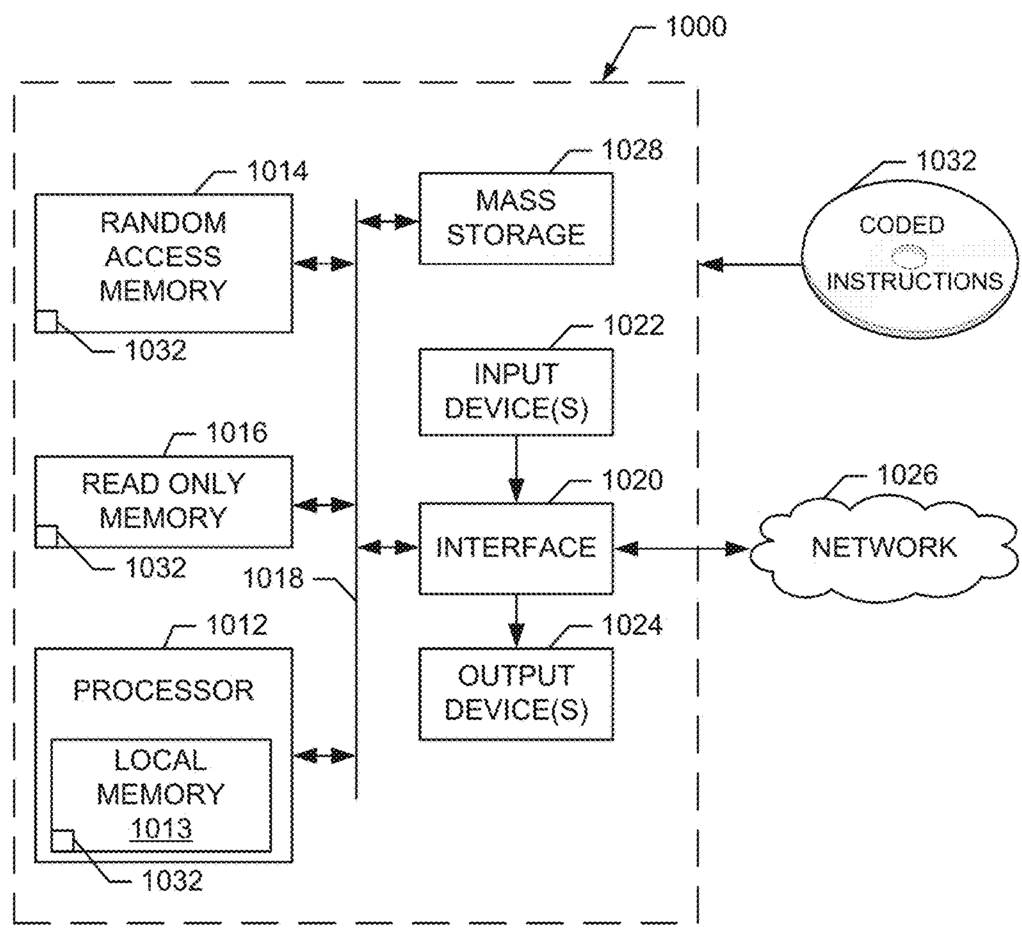
FIG. 10 is a block diagram of an example processing platform capable of executing machine readable instructions to implement the example temperature monitoring unit of FIG. 7.

FIG. 10 is a block diagram of an example processing platform 1000 capable of executing machine readable instructions to implement the temperature monitoring unit 602 of FIGS. 6-7. The processing platform 1000 can be, for example, a server, a computer, a mobile device (e.g., a laptop, a smart phone, etc.), an Internet appliance, the aircraft control system 604, the monitoring device 606, or any other type of computing device.

The system 1000 of the instant example includes a processor 1012. For example, the processor 1012 can be implemented by one or more microprocessors or controllers from any desired family or manufacturer.

The processor 1012 includes a local memory 1013 (e.g., a cache) and is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processing platform 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system, a switch, a button, an aircraft cockpit console device, etc.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device (e.g., communication device 56) such as a modem or network interface card to facilitate exchange of data with external computers via a network 1026 (e.g., an Ethernet connection, a digital subscriber line (DSL), a telephone line, coaxial cable, a cellular telephone system, a satellite communications system, etc.).

The processing platform 1000 also includes one or more mass storage devices 1028 for storing software and data. Examples of such mass storage devices 1028 include floppy disk drives, hard drive disks, compact disk drives and digital versatile disk (DVD) drives. The mass storage device 1028 may implement the local storage device 62.

The coded instructions 1032 that, when executed, cause a machine to perform the example method 800 of FIGS. 8-9 may be stored in the mass storage device 1028, in the volatile memory 1014, in the non-volatile memory 1016, and/or on a removable storage medium such as a CD or DVD.

Although certain example methods, apparatus and articles of manufacture have been described herein, the scope of coverage of this disclosure is not limited thereto. On the contrary, this disclosure covers all methods, apparatus and articles of manufacture fairly falling within the scope of the claims.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

The invention claimed is:

1. An apparatus comprising:

a processor having:

a temperature monitoring unit to be communicatively coupled to a first temperature sensor of at least one of a wheel or a fuse plug coupled to the wheel, and a second temperature sensor of a brake assembly operatively coupled to the wheel, the temperature monitoring unit including:

an initial temperature determiner to determine an initial temperature of at least one of the wheel or the fuse plug based on a temperature value to be provided by the first temperature sensor;

a brake energy estimator to estimate a temperature of the brake assembly based on a temperature value provided by the second temperature sensor;

a subsequent temperature estimator to estimate a subsequent temperature of at least one of the wheel or the fuse plug, the subsequent temperature to be determined after the determination of the initial temperature;

a peak temperature estimator to determine if the subsequent temperature is a peak temperature of the at least one of the wheel or the fuse plug; and in response to determining that the subsequent temperature is the peak temperature, a temperature management processor to determine if the fuse plug will melt within a predetermined amount of time and output an indication corresponding to the determination of the fuse plug melting within the predetermined amount of time.

2. The apparatus of claim 1, further including a temperature management processor to determine if the subsequent temperature is equal to or greater than a threshold temperature.

3. The apparatus of claim 2, wherein the temperature management processor is to generate a message indicating that a temperature of the fuse plug has exceeded the threshold temperature when the subsequent temperature is at or above the threshold temperature.

4. The apparatus of claim 1, further including a position determiner to determine a position of the first temperature sensor relative to a rotational position of the fuse plug.

5. The apparatus of claim 4, further including a position sensor to receive a positional value of the wheel, the position determiner to receive the positional value from the position sensor to determine the rotational position of the fuse plug.

6. The apparatus of claim 1, wherein the initial temperature is a temperature of the fuse plug at a first time during at least one of during a braking event, at a conclusion of the braking event, or after the braking event.

7. The apparatus of claim 1, wherein the brake energy estimator determines an amount of brake energy to be transferred to at least one of the wheel or the fuse plug from the brake assembly based on the temperature of the brake assembly and the initial temperature of at least one of the wheel or the fuse plug.

8. A method comprising:

determining an initial temperature of at least one of a wheel or a fuse plug based on a temperature value to be provided by a first temperature sensor;

estimating an amount of brake energy to be transferred from a brake assembly to the at least one of the wheel or the fuse plug based on a temperature value of the brake assembly provided by a second temperature sensor;

determining an estimated temperature increase of the at least one of the wheel or the fuse plug based on a brake event;

in response to determining the initial temperature and the estimated temperature increase, estimating, by executing an instruction with a processor, a subsequent temperature of the at least one of the wheel or the fuse plug;

determining if the subsequent temperature is a peak temperature;

in response to determining that the subsequent temperature is the peak temperature, determining if the fuse plug will melt within a given amount of time; and outputting a first message corresponding to the determination of the fuse plug melting within the given amount of time.

9. The method of claim 8, further including determining if the subsequent temperature is equal to or greater than a threshold temperature.

10. The method of claim 9, further including outputting a second message indicating that the fuse plug temperature at least one of has exceeded or will exceed the threshold temperature in a given amount of time when the subsequent temperature is at or above the threshold temperature.

11. The method of claim 8, further including determining a position of the first temperature sensor relative to a rotational position of the fuse plug.

12. The method of claim 11, further including receiving a positional value of the wheel.

13. The method of claim 12, further including determining the rotational position of the fuse plug based on the received positional value of the wheel.

14. The method of claim 8, wherein the initial temperature is a temperature of the fuse plug at a first time during at least one of during a braking event, at a conclusion of the braking event, or after the braking event.

15. A tangible computer-readable medium comprising instructions that, when executed, cause a machine to:

determine an initial temperature of at least one of a wheel or a fuse plug based on a temperature value to be provided by a first temperature sensor;

estimate a temperature of a brake assembly based on a temperature value provided by a second temperature sensor;

after determining the initial temperature, estimate a subsequent temperature of the at least one of the wheel or the fuse plug;

determine if the subsequent temperature is a peak temperature;

determine if the fuse plug will melt in a given amount of time in, response to determining that the subsequent temperature is the peak temperature; and output an indication to a user corresponding to the determination of the fuse plug melting in the given amount of time.

16. The computer-readable medium as defined in claim 15 comprising instructions that, when executed, cause the machine to determine if the subsequent temperature is equal to or greater than a threshold temperature.

17. The computer-readable medium as defined in claim 16 comprising instructions that, when executed, cause the machine to generate a message indicating that the fuse plug temperature at least one of has exceeded or will exceed the threshold temperature in the given amount of time when the subsequent temperature is at or above the threshold temperature.

18. The computer-readable medium as defined in claim 15 comprising instructions that, when executed, cause the machine to determine a position of the first temperature sensor relative to a rotational position of the fuse plug.

19. The computer-readable medium as defined in claim 18 comprising instructions that, when executed, cause the machine to receive a positional value of the wheel.

20. The computer-readable medium as defined in claim 19 comprising instructions that, when executed, cause the machine to determine the rotational position of the fuse plug based on the received positional value of the wheel.

* * * * *